(12) United States Patent
Michel et al.

(10) Patent No.: US 7,139,162 B2
(45) Date of Patent: Nov. 21, 2006

(54) ELECTRODE AND METHOD FOR THE PRODUCTION THEREOF

(75) Inventors: Hartmut Michel, Heidenheim (DE); Christoph Weber, Heidenheim (DE)

(73) Assignee: Epcos AG, Munich (DE)

( * ) Notice: Subject to any disclaimer, the term of this patent is extended or adjusted under 35 U.S.C. 154(b) by 14 days.

(21) Appl. No.: 10/512,788

(22) PCT Filed: May 5, 2003

(86) PCT No.: PCT/DE03/01425

§ 371 (c)(1),
(2), (4) Date: Oct. 27, 2004

(87) PCT Pub. No.: WO03/094183

PCT Pub. Date: Nov. 13, 2003

(65) Prior Publication Data

US 2005/0213286 A1    Sep. 29, 2005

(30) Foreign Application Priority Data

May 3, 2002  (DE) ................. 102 19 908

(51) Int. Cl.
*H01G 9/04*  (2006.01)

(52) U.S. Cl. .............. 361/508; 361/502; 361/509; 361/512; 361/523; 361/528; 429/34; 429/39; 29/25.03

(58) Field of Classification Search ............... 361/508, 361/509–512, 502–504, 523–525, 528–534; 29/25.03; 429/34–39, 245
See application file for complete search history.

(56) References Cited

U.S. PATENT DOCUMENTS

| 3,256,468 | A |   | 6/1966  | Jenny et al. |
| 4,530,743 | A | * | 7/1985  | deNora ................. 205/523 |
| 5,150,283 | A |   | 9/1992  | Yoshida et al. |
| 5,584,890 | A | * | 12/1996 | MacFarlane et al. ...... 29/25.03 |
| 6,325,831 | B1 |  | 12/2001 | Chiavarotti et al. |
| 6,400,554 | B1 | * | 6/2002  | Shiraishi et al. ............ 361/508 |
| 6,645,657 | B1 | * | 11/2003 | Huang et al. ................. 429/34 |

FOREIGN PATENT DOCUMENTS

| DE | 195 34 047 | 12/1996 |
| EP | 0 272 926  | 6/1988  |
| EP | 0 917 166  | 5/1999  |
| EP | 0 966 008  | 12/1999 |
| EP | 1 202 302  | 5/2002  |
| JP | 01-033915  | 2/1989  |
| JP | 01-106614  | 4/1989  |
| JP | 03-131014  | 6/1991  |
| JP | 05-013282  | 1/1993  |

* cited by examiner

Primary Examiner—Nguyen T. Ha
(74) Attorney, Agent, or Firm—Fish & Richardson P.C.

(57) ABSTRACT

An electrode includes a collector that is substantially flat and electrically conductive, an inner intermediate layer that is substantially corrosion resistant and conductive and that is on at least part of a surface of the collector, and an outer intermediate layer that is substantially corrosion resistant and conductive and that is on at least part of the inner intermediate layer. The electrode also includes an electrode layer containing carbon, which is on at least part of a surface of the outer intermediate layer that faces away from the inner intermediate layer.

27 Claims, 3 Drawing Sheets

ELECTRODE AND METHOD FOR THE PRODUCTION THEREOF

BACKGROUND

The electrode material for the electrodes of many electrical components, for example of electrochemical double-layer capacitors or pseudo-capacitors, is carbon, such as activated carbon. In this case, the electrode material is often applied in powder form to collectors with good electrical conductivity or produced by chemical or electrochemical deposit processes. The electrically conductive collectors are often in the form of thin metal foils such as aluminum foils. If aluminum foils are used, the aluminum oxide on the surface of the foil, which increases electric resistance, is removed, for example by etching, so that the electrode material can be applied subsequently. Often the surface area of the aluminum foil is enlarged by creating a surface topography, for example by etching. This also enlarges the surface area of the electrodes and results in capacitors with a higher capacity. When processing the aluminum foils coated with the electrode material, but also when using these electrodes in electrochemical double-layer or pseudo-capacitors, it is absolutely essential to ensure that the surface-related electrical resistance between the collector, and thereby the aluminum foil, and the electrode material remains at a minimum level during the lifetime of the capacitor.

However, during operation of electrochemical double-layer or pseudo-capacitors, the result is often a de-lamination of the electrode material from the aluminum foil and the creation of a layer between the aluminum foil and the electrode material that has poor electrical conductivity. This deterioration of the contacts between the electrode material and the collector often increases the series resistance of the capacitors, thus resulting in a higher ohmic loss when operating these capacitors.

SUMMARY

The purpose of the present invention is to offer an electrode that shows much less of an increase in series resistance when operating the electrical component.

This purpose is achieved by an electrode according to claim 1. Other claims cover advantageous embodiments of the electrode and methods for its manufacture as also covers a capacitor with this electrode.

An electrode according to the invention has a flat-surface, electrically conductive collector to which a seamless, corrosion-resistant, metallically conductive, inner intermediate layer is applied. Another seamless, corrosion-resistant, metallically conductive, outer intermediate layer is applied on top of the inner intermediate layer. A seamless electrode layer containing carbon is applied to this outer surface.

In contrast to a traditional electrode where the electrode material is in direct contact with the aluminum foil, in the electrode according to the invention there are at least two corrosion-resistant, metallically conductive, intermediate layers between the electrode layer and the collector. Because of their resistance to corrosion and their metallic conductivity, these intermediate layers guarantee both a bond with good electric conductivity between the collector and the electrode layer and, due to their resistance to corrosion, they are particularly stable, for example, with regard to the formation of surface oxide layers with poor electrical conductivity.

In another advantageous embodiment of the invention, the outer surface of the outer intermediate layer has a certain degree of roughness. This roughness of the outer surface of the outer intermediate layer allows for an especially good and tight contact between the outer intermediate layer and the electrode material, resulting in a good contact not only between the collector and the intermediate layers but also between the intermediate layers and the electrode material.

Roughness in the sense of the invention refers to a surface that has a roughness height between 1 and 50 μm at even surface topography. The roughness height refers to the difference in height between the "valleys" and the "peaks" on the surface, indicating thus the measure of roughness of the surface. The peaks and valleys on the surface are distributed here evenly over the surface, resulting in an even surface topography. The roughness height can easily be determined by an expert, e.g., via scanning electrode microscopy.

In another embodiment of the electrode according to the invention, the inner and outer intermediate layers and another electrode layer are applied to the other main surface of the collector. In this variant, both main surface areas of the collector are thus covered with the intermediate layers and the electrode layers.

Preferably, the outer surface of the outer intermediate layer has a roughness height of about 1 to 10 μm at even surface topography. Roughness heights of this magnitude are especially easy to achieve, e.g., by chemical etching, but still guarantee good bonding and interlocking of the outer intermediate layer with the electrode layer.

The inner intermediate layer preferably includes a metal, e.g., a metal of the IV to VI side group of the periodic system. The metal can be selected from among the following metals: titanium, molybdenum, tungsten, vanadium, tantalum, zirconium and niobium. These metals allow for easy processing, and at the same time are very resistant to corrosion.

In another advantageous embodiment of an electrode according to the invention, the outer intermediate layer is made of a metal alloy, consisting, for example, of the following alloys: metal carbide, metal nitride, metal carbon nitride and metal boride.

Metal alloys in the sense of the invention are blends of metals with good metallic conductivity and at least one further component; metal carbide, metal boride, metal carbon nitride and metal nitride are therefore considered alloys. In this case, the metal(s) of the metal alloy is(are) chosen from among the IV to VI side group of the periodic system and thus consists of one of the following metals, as mentioned above: titanium, molybdenum, tungsten, vanadium, tantalum, zirconium and niobium. The intermediate layer can be metal carbide, metal nitride or metal carbon nitride, with carbon nitrides being mixed crystals of carbides and nitrides.

In another embodiment, the electrode layer includes carbon. This can be, for example, activated carbon that is applied in paste-like or solid form. Electrodes with such electrode layers can, for example, be used in double-layer capacitors.

It is also possible for the electrode layer to include, for example, electrically conductive polymers. Electrodes with such electrode layers can, e.g., be used in pseudo-capacitors.

The collector may include an aluminum foil. In this case, the collector preferably has perforations. In this case, each perforation penetrates the two opposing main surfaces of the collector, thus constituting a hole through the collector. In this especially advantageous embodiment of an electrode according to the invention, the intermediate layer and electrode layer bond particularly well with the collector because of the perforations in the collector and the seamless fit with the inner intermediate layer and the electrode layer applied to it.

In this variant of an electrode according to the invention, it is especially advantageous to apply the inner and outer intermediate layers and the electrode layer also to the other main surface of the collector. In this case, the intermediate layers applied to the opposing main surfaces and the electrode layers in the perforations of the collector are able to join, resulting in an especially good bond among the intermediate layers, the electrode layers and the collector.

Collectors with perforations according to the invention may also contain a network of metal wires, making it possible to produce the collector because the metal wires are interwoven into a network. The collector may also contain an etched foam metal. Foam metals are frothed and made porous in the heat-melting bath through the generation of gas. In the process, gasses in the metal form bubbles, which, upon cooling and hardening, form hollows in the metal. The walls of these hollows are often very thin, making it possible to open these hollows on both sides by selective etching, e.g., with acids or bases, and creating thereby the perforations. It is also possible to manufacture the collector with perforations, e.g., by slitting and stretching a metal foil.

Collectors according to the invention may also have metal foils with many small holes with diameters between 0.2 mm and 2 mm that were created e.g., in a stamping process with a roller or plate or by laser welding.

The purpose of the invention is also to provide a method to manufacture an electrode according to the invention in the following process steps: in process step A) an inner, metallically conductive, intermediate layer is formed on a main surface of a flat-area collector. Then, in process step B), an outer, metallically conductive, intermediate layer is formed on the inner intermediate layer. Finally, in process step C), a first electrode layer containing carbon is formed on the outer intermediate layer.

In an advantageous embodiment of the method, a metal layer is formed in process step A) via chemical vapor deposition (CVD) or via physical vapor deposition (PVD).

It is advantageous to form a metal alloy in process step B) also via the CVD or PVD method. Both methods are known to the expert; in the CVD method, metals or metal alloys are often precipitated from the glass phase, while in the PVD method, ionized particles are deposited in an electrical field.

In another advantageous embodiment of the method according to the invention, a metal layer is formed as an inner intermediate layer in process step A), and subsequently, in process step B), areas close to the surface of this inner metal layer are reacted with at least one material, carbon, nitrogen or boron, precipitated from the gas phase. In the process, a metal alloy is formed as outer intermediate layer that is chosen from among the following, depending on the material used: metal carbide, metal nitride, metal carbon nitride and metal boride. A particularly advantageous tight interlock between the two intermediate layers is achieved by reacting the inner intermediate layer, which In this case, is a metal layer, with the materials from the gas phase mentioned above. Yet in process step B) it is also possible to precipitate a metal alloy as an outer intermediate layer directly from the gas phase without the formation of an alloy with the inner intermediate layer.

In another advantageous embodiment of a method according to the invention, the outer surface of the outer intermediate layer is roughened in process step B1) before process step C) and after forming the outer intermediate layer. The roughening of the outer surface of the outer intermediate layer may be achieved through mechanical or chemical processes. For example, it can be achieved by sandblasting or through irritation, e.g., with acids such as sulfuric acid or nitric acid. As already explained, this rough surface of the outer intermediate layer has the advantage of making for a particularly close bond with the electrode layer. It is also possible to form the outer intermediate layer in such a way so that it has a surface with the appropriate roughness already. Important process parameters for the deposit of a rough outer intermediate layer are above all the temperature, the precipitation velocity of the particles of the outer intermediate layer and the gas pressure. The advantage of such a variant of a method according to the invention is that the outer intermediate layer is formed with a surface that has a certain degree of roughness, preferably in one single process in step B) without the subsequent need to use the sandblasting or chemical etching processes mentioned above.

In another embodiment of the method according to the invention, the electrode layer is formed in process step C) by scraping during a liquid or viscous phase that involves the electrode material.

If the collector is an aluminum foil, surface layers of the aluminum foil are removed before process step A) in order to improve the conductivity of the foil. In the process, the aluminum oxide layer of the aluminum foil is normally removed, e.g., by an oxygen-plasma treatment, an electrochemical etching process or by non-reactive sputter etching.

The purpose of the invention is also an electrochemical capacitor with at least two electrodes according to the invention, with a porous separator located between the electrodes and with both the electrodes and the separator being in contact with an electrolyte. The porous separator, in this case, may contain a porous polymer film, fleece, felts, tissues made of polymers, fiberglass, or also paper. Such an electrochemical capacitor has the advantage over traditional capacitors in that it results in a smaller increase in series resistance during operation compared to traditional capacitors.

In what follows, the invention will be explained in more detail, with examples of embodiment and drawings.

DETAILED DESCRIPTION

Figure 1:
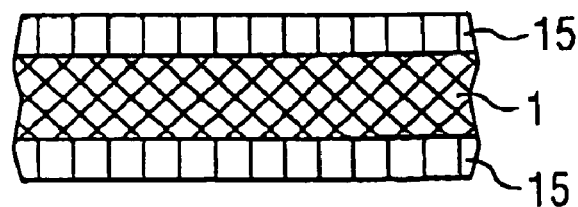
FIG. 1 shows a cross section of a traditional electrode.

FIG. 1 shows a cross section of a traditional electrode, with the electrode layer 15, for example an aluminum foil, being applied to both sides of the collector 1. With such an electrode, during the operation of the capacitor it can occur that the electrode layer 15 separates from the collector 1, resulting in an increase in series resistance of the capacitor, as already noted above.

Figure 2A:
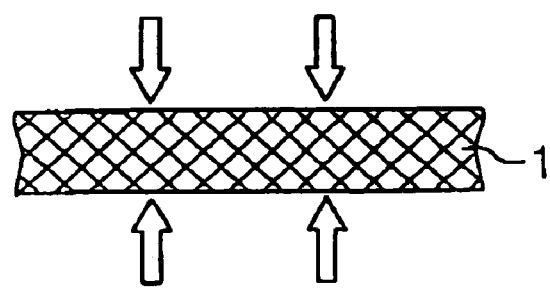
FIGS. 2A to 2E show a cross section of possible variants of a manufacturing method for electrodes according to the invention.

In FIG. 2A, the collector 1, for example, an aluminum foil, is shown in cross section before process step A) of the method according to the invention. The arrows mark schematically the two main surfaces of the collector 1 on which the inner intermediate layer can be formed subsequently in process step A). This can be achieved, as already noted above, via the CVD or the PVD method.

Figure 2B:
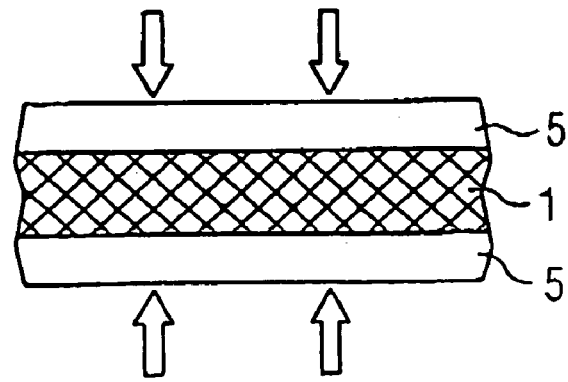

FIG. 2B shows the collector 1 with inner intermediate layers 5 applied on both sides under process step A). The inner intermediate layer 5 may, for example, be titanium. The thickness of the inner intermediate layer is typically between 1 and 2 μm. The arrows mark the areas to which the outer intermediate layer is applied in process step B).

Figure 2C:
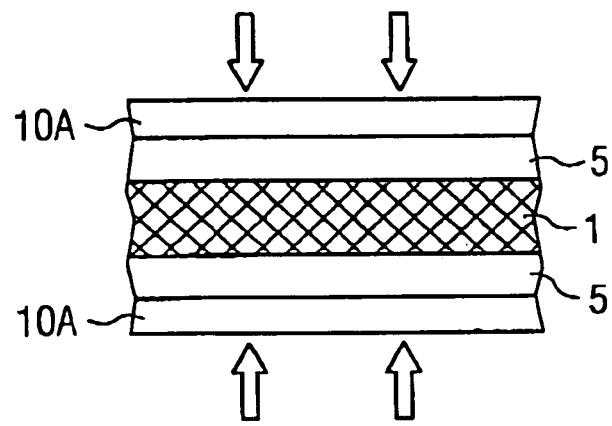

FIG. 2C shows the arrangement of layers following process step B). It can be seen in the method shown here that the collector 1 is covered on both sides by the inner intermediate layer 5. On this inner intermediate layer 5 is the outer intermediate layer 10A of which outer surface is smooth upon formation.

Figure 2D:
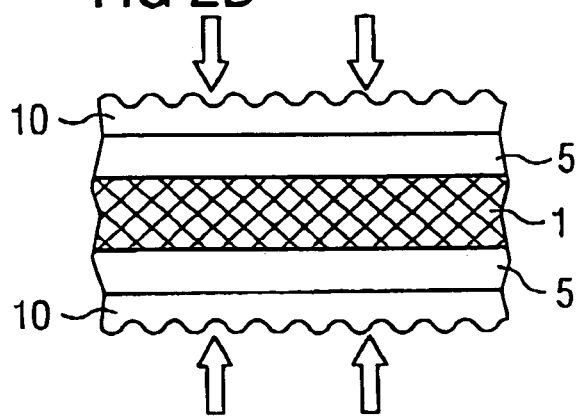

FIG. 2D shows a cross section of the arrangement of layers after the additional process step B1). It can be seen that the outer surface of the outer intermediate layer has been roughened.

This can be achieved, for example, by sandblasting or through chemical etching. This forms the outer intermediate layer 10 whose outer surface shows a certain degree of roughness.

Figure 2E:
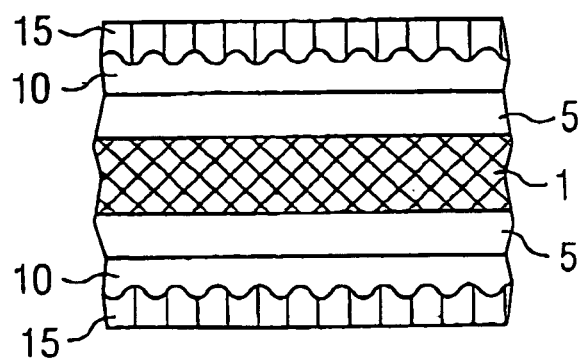

FIG. 2E shows an electrode according to the invention following process step C). It can be seen that the electrode layer 15 has been applied to both sides of the outer surface of the rough outer intermediate layer. This can be achieved, for example, by scraping on a liquid of viscous phase containing the electrode material. It is also possible to laminate a dry film onto it.

The liquid or viscous phase In this case, often contains carbon powder of a medium grain size between 0.01 and 20 μm. The carbon powder is often mixed with a binder, e.g., polytetrafluorethylene, polyvinyldifluoride and carboxymethyl cellulose, which in its dry state binds the material of the electrode layer together. The weight proportion of the binder in the mix is between 2 and 20%, typically 5%. The thickness of the collector foil In this case, is often between 20 and 70 μm.

Figure 3:
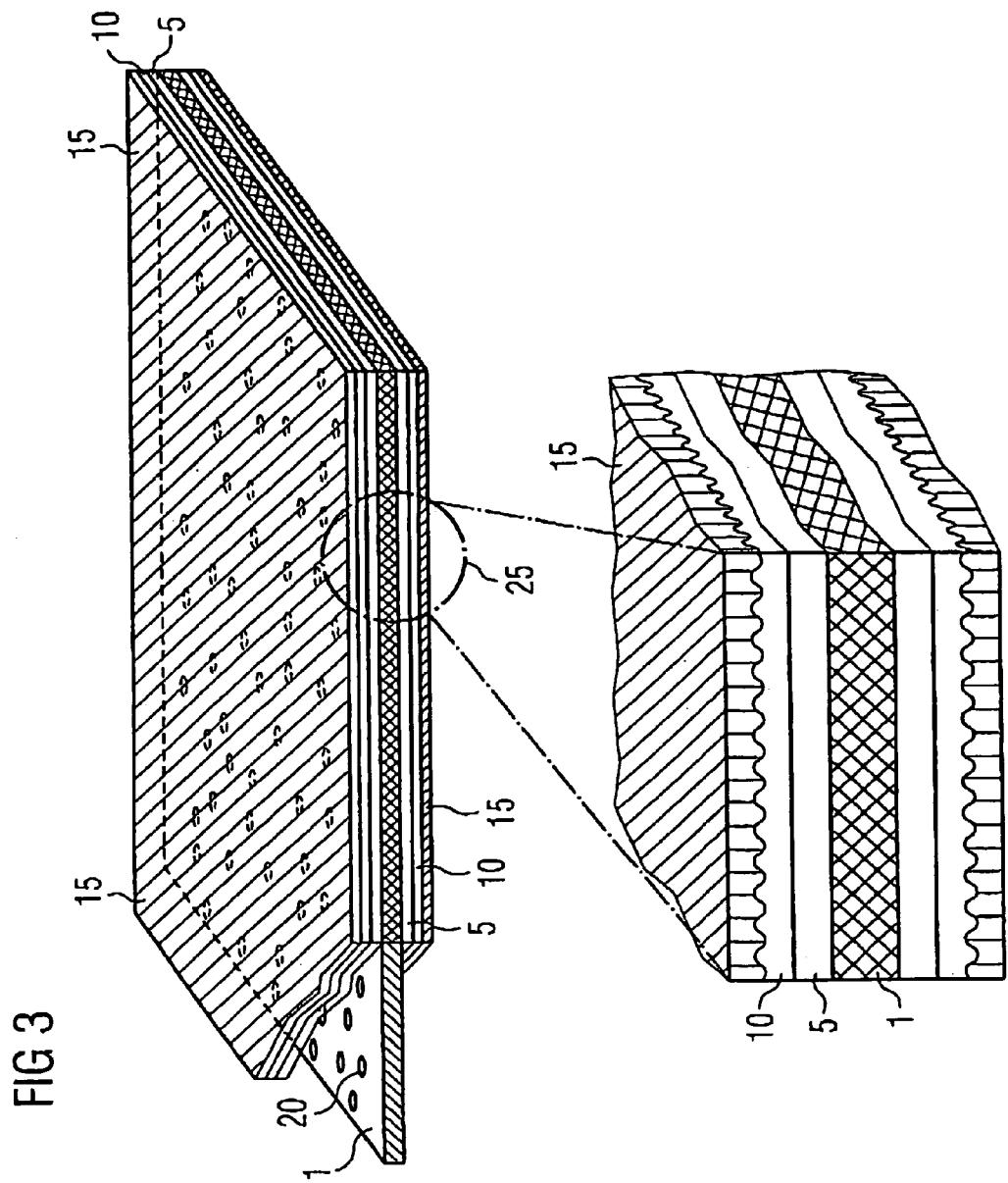
FIG. 3 shows a perspective view of another advantageous variant of an electrode according to the invention.

FIG. 3 shows a particularly advantageous variant of an electrode according to the invention that has perforations 20 in the collector 1. In this case, the collector, as already shown under the method, is also covered on both sides by the two intermediate layers and the electrode layer, allowing the intermediate layers and the electrode layers to enter into contact on both sides through the perforations in a very advantageous manner. This results in a particularly good and solid interlock between the collector and the layers applied to it. An enlarged section of the cutting edge 25 shows the sequence of the various layers in detail.

All drawings show the electrodes according to the invention only schematically. For this reason the thickness of the various layers of the electrode according to the invention and the ratio of their thickness to each other may vary widely among the different embodiments.

Nor is the invention limited to the embodiments shown here. It is, for example, also possible to use the electrodes according to the invention in hybrid or pseudo-capacitors. Other variations are also possible, for example, with regard to the shape of the electrodes.

What is claimed is:

1. An electrode comprising:
   a collector that is substantially flat and electrically conductive;
   an inner intermediate layer that is substantially corrosion resistant and conductive, the inner intermediate layer being on at least part of a surface of the collector;
   an outer intermediate layer that is substantially corrosion resistant and conductive, the outer intermediate layer being on at least part of the inner intermediate layer; and
   an electrode layer comprising carbon, the electrode layer being on at least part of a surface of the outer intermediate layer that faces away from the inner intermediate layer.

2. The electrode of claim 1, wherein the surface of the outer intermediate layer is rough.

3. The electrode of claim 1, further comprising:
   a second inner intermediate layer that is substantially corrosion resistant and conductive, the second inner intermediate layer being on at least part of a second surface of the collector;
   a second outer intermediate layer that is substantially corrosion resistant and conductive, the second outer intermediate layer being on at least part of the second inner intermediate layer; and
   a second electrode layer comprising carbon, the second electrode being on at least part of a surface of the second outer intermediate layer that faces away from the second inner intermediate layer.

4. The electrode of claim 1, wherein the surface of the outer intermediate layer comprises roughness portions having a height of between 1 and 10 μm.

5. The electrode of claim 1, wherein the inner intermediate layer comprises a metal.

6. The electrode of claim 5, wherein the metal is selected from the IV to VI side groups of the periodic table.

7. The electrode of claim 5, wherein the metal comprises one or more of titanium, molybdenum, tungsten, vanadium, tantalum, zirconium and niobium.

8. The electrode of claim 1, wherein the outer intermediate layer comprises a metal alloy.

9. The electrode of claim 8, wherein the metal alloy comprises metal carbide and/or metal nitride.

10. The electrode of claim 8, wherein a metal in the metal alloy is selected from the IV to VI side groups of the periodic table.

11. The electrode of claim 8, wherein a metal in the metal alloy comprises one or more of titanium, molybdenum, tungsten, vanadium, tantalum, zirconium and niobium.

12. The electrode of claim 1, wherein the collector comprises an aluminum foil.

13. The electrode of claim 1, wherein the collector has perforations.

14. The electrode of claim 13, wherein the collector comprises a network of metal wires.

15. The electrode of claim 13, wherein the collector comprises an etched foam metal.

16. The electrode of claim 13, wherein the collector comprises a metal foil with stamped or laser-welded holes.

17. The electrode of claim 1, wherein the collector comprises a stretched aluminum foil with perforations.

18. A method of manufacturing an electrode, comprising:
   forming an inner intermediate layer on at least part of a surface of a collector, the surface of the collector being substantially flat and the inner intermediate layer being conductive;
   forming an outer intermediate layer on at least part of the inner intermediate layer, the outer intermediate layer being conductive; and
   forming an electrode layer comprising carbon on at least part of the outer intermediate layer.

19. The method of claim 18, wherein the inner intermediate layer is formed via a CVD or PVD process.

20. The method of claim 18, wherein forming the outer intermediate layer comprises forming a metal alloy via a CVD or PVD process.

21. The method of claim 18, wherein forming the inner intermediate layer comprises forming a metal layer; and
    wherein areas of the inner intermediate layer react, during formation of the outer intermediate layer, with materials comprising one or more of carbon, nitrogen and boron, to produce at least one of metal carbide, metal nitride, metal carbon nitride and metal boride.

22. The method of claim 20, wherein the metal alloy comprises one of metal carbide, metal nitride and metal boride.

23. The method of claim 18, further comprising roughening a surface of the outer intermediate layer on which the electrode layer is to be formed prior to forming the electrode layer.

24. The method of claim 23, wherein the surface of the outer intermediate layer is roughened via a mechanical process or a chemical process.

25. The method of claim 18, wherein the electrode layer is formed by applying, to the outer intermediate layer, a liquid or viscous phase containing electrode material.

26. The method of claim 18, wherein the collector comprises aluminum foil, and wherein surface layers of the aluminum foil are removed before forming the inner intermediate layer.

27. A capacitor, comprising:
    a first electrode;
    a second electrode;
    a porous separator between the first and second electrodes; and
    an electrolyte that contacts the electrodes and the porous separator; are
    wherein at least one of the first and second electrodes comprises:
        a collector that is substantially flat and electrically conductive;
        an inner intermediate layer that is substantially corrosion resistant and conductive, the inner intermediate layer being on at least part of a surface of the collector;
        an outer intermediate layer that is substantially corrosion resistant and conductive, the outer intermediate layer being on at least part of the inner intermediate layer; and
        an electrode layer comprising carbon, the electrode layer being on at least part of a surface of the outer intermediate layer that faces away from the inner intermediate layer.

* * * * *

UNITED STATES PATENT AND TRADEMARK OFFICE
CERTIFICATE OF CORRECTION

| | |
|---|---|
| PATENT NO. | : 7,139,162 B2 |
| APPLICATION NO. | : 10/512788 |
| DATED | : November 21, 2006 |
| INVENTOR(S) | : Hartmut Michel and Christoph Weber |

Page 1 of 1

It is certified that error appears in the above-identified patent and that said Letters Patent is hereby corrected as shown below:

Column 6, Claim 3, Line 21;
Insert --layer-- between "electrode" and "being"

Column 8, Claim 27, Line 7;
Delete "are"

Signed and Sealed this

First Day of May, 2007

JON W. DUDAS
*Director of the United States Patent and Trademark Office*